United States Patent
Miyamae et al.

(10) Patent No.: US 7,193,525 B2
(45) Date of Patent: Mar. 20, 2007

(54) METHODS AND APPARATUS FOR DOWNHOLE INTER-TOOL COMMUNICATION

(75) Inventors: Shohachi Miyamae, Machida (JP); Tetsuya Tanaka, Sugar Land, TX (US); David Santoso, Sagamihara (JP); David Mathison, Sugar Land, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 480 days.

(21) Appl. No.: 10/690,382

(22) Filed: Oct. 21, 2003

(65) Prior Publication Data

US 2005/0083209 A1   Apr. 21, 2005

(51) Int. Cl.
*G01V 3/00* (2006.01)

(52) U.S. Cl. .............................. 340/853.1; 340/854.7; 340/855.5; 367/80

(58) Field of Classification Search ............. 340/853.1, 340/854.9, 853.4, 854.7; 367/81, 80; 175/45, 175/61
See application file for complete search history.

(56) References Cited

U.S. PATENT DOCUMENTS

| | | | |
|---|---|---|---|
| 4,355,310 A | 10/1982 | Belaigues et al. | |
| 4,718,011 A | 1/1988 | Patterson, Jr. | |
| 5,191,326 A | 3/1993 | Montgomery | |
| 5,331,318 A | 7/1994 | Montgomery | |
| 5,439,064 A * | 8/1995 | Patton ........................ | 175/24 |
| 5,959,547 A | 9/1999 | Tubel et al. | |
| 6,552,665 B1 | 4/2003 | Miyamae et al. | |
| 6,630,890 B1 | 10/2003 | Endo et al. | |
| 2002/0018399 A1 | 2/2002 | Schultz et al. | |
| 2002/0020533 A1* | 2/2002 | Tubel ........................ | 166/313 |
| 2002/0179303 A1* | 12/2002 | Maxit et al. ................ | 166/369 |
| 2003/0147360 A1 | 8/2003 | Nero et al. | |

FOREIGN PATENT DOCUMENTS

| | | |
|---|---|---|
| GB | 1432335 | 4/1976 |
| GB | 1432336 | 4/1976 |
| WO | WO 02/25317 A1 | 3/2002 |

* cited by examiner

*Primary Examiner*—Jeffery Hofsass
*Assistant Examiner*—Sisay Yacob
(74) *Attorney, Agent, or Firm*—Karan Singh; William Batzer; Dale Gaudier

(57) ABSTRACT

A method and apparatus for communicating between downhole tools without the necessity of routing the communication through a surface module. Communications sent by downhole tools are examined and extracted downhole. If the communications are intended for other downhole tools, the communications are copied to a downlink and send to a specific intended tool, a group of tools, or all the tools. This is all done downhole, significantly reducing the latency between command and response.

48 Claims, 12 Drawing Sheets

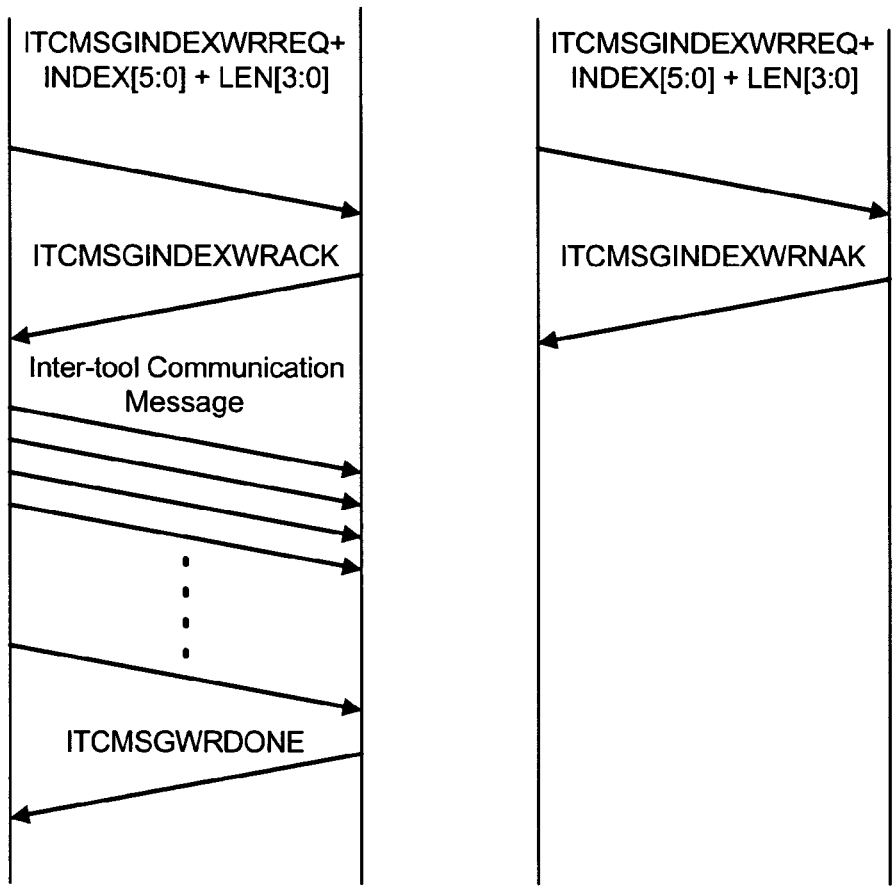
FIG. 9 Writing Inter-Tool Communication Message (Index)

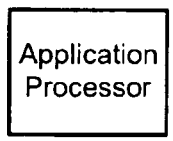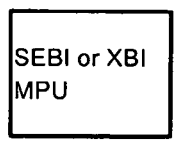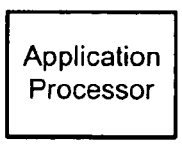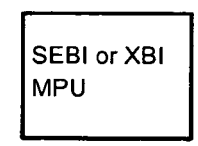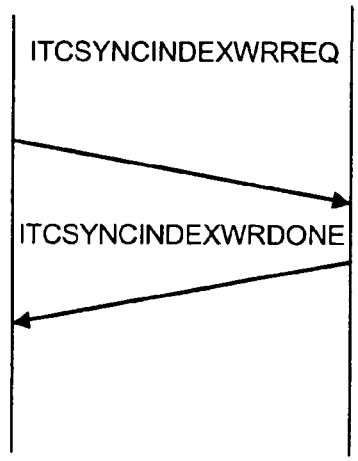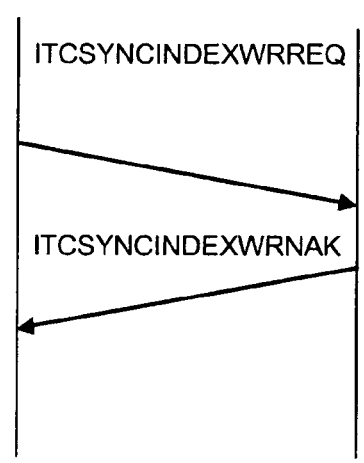
FIG. 10 Writing Inter-Tool Communication Sync Pulse (Index)

METHODS AND APPARATUS FOR DOWNHOLE INTER-TOOL COMMUNICATION

FIELD OF THE INVENTION

The present invention relates generally to methods and apparatus for gathering data from sub-surface formations. More particularly, the present invention relates to methods and apparatus for communicating between various downhole tools traversing a sub-surface formation.

BACKGROUND OF THE INVENTION

Wireline logging has been done for many years to enhance recovery of oil and gas deposits. In borehole logging, one method of making measurements underground includes attaching one or more tools to a cable connected to a surface system. The tools are then lowered into a borehole by the cable and then drawn back to the surface ("logged") through the borehole while taking measurements. The cable often includes multiple conductors, such as a 7-conductor "hepta-cable." The conductors of the cable provide power to the tools from the surface and a route for electrical signals to be passed between the tools and the surface system. The signals may be, for example, tool control signals that pass from the surface system to the tools, and tool operation signals and data which pass from the tools to the surface system.

A common telemetry system for facilitating communication between the surface system and the tools may include a telemetry module (TM) at the surface, the cable, and a downhole telemetry cartridge (TC) at the head of a string of tools. Each downhole tool will typically include a downhole toolbus interface (BI) for communicating with the TC via a downhole toolbus (TB). This telemetry system is configured to allow data flows in two directions: from the TM to the tools and from the tools to the TM. Communications from the subsurface up the borehole to the TM are called an "uplink". Communications from the TM down the borehole to the subsurface are termed a "downlink".

In a typical telemetry system, each tool sends its data to the downhole telemetry cartridge through the toolbus. The telemetry cartridge then sends the data to the telemetry module, usually via a wireline cable. While this configuration simplifies the downhole telemetry, it requires that all data be communicated to the surface. Thus, in the situations where it is desired to communicate data or a signal from one downhole tool to another downhole tool, the typical telemetry configuration requires that the data be sent from the first tool to the TC, from which it is communicated via an uplink to the TM, then communicated from the TM via a downlink back to second tool via the TC. The time required for such up-and-down communication is inefficient, particularly in deep boreholes where the distance between the TC and TM can be large. A method for communicating downhole between borehole tools is needed. It would be advantageous if this communication method were compatible with conventional downhole tools designed to communicate with a downhole telemetry cartridge through a toolbus.

SUMMARY OF THE INVENTION

The present invention addresses the above-described deficiencies and others. Specifically, the present invention provides a method of downhole communication between wireline tools. The method comprises examining an uplink data stream with a downhole module; extracting any data intended for downhole tools; and transmitting any extracted data intended for downhole tools via a downlink data stream from the downhole module to an intended downhole tool. The data intended for downhole tools does not require transmission to the surface before it is sent downhole. The downhole module may be a downhole telemetry cartridge comprising a downhole toolbus controller; a downhole device comprising a software enhanced toolbus interface (SEBI); or a downhole device comprising an extended toolbus interface (XBI). In some embodiments, the downhole device may be a borehole tool. The method may further include transmitting any data intended for downhole tools via a downlink data stream from the downhole to a group of downhole tools or broadcasting it to all downhole tools.

According to another aspect there is a borehole telemetry system including a surface telemetry module, a downhole module, and a multiplexed data link between the surface and modules capable of transferring data alternately between an uplink in which data is transferred from the downhole module to the surface module and a downlink in which data is transferred from the surface module to the downhole module; where the uplink data can be examined and selectively extracted by the downhole module. In some embodiments, the downhole module may be a downhole telemetry cartridge comprising a downhole toolbus controller; a downhole device comprising a software enhanced toolbus interface (SEBI); or a downhole device comprising an extended toolbus interface (XBI). The downhole module can extract any uplink data intended for downhole tools, and store and copy any uplink data extracted from the uplink to the downlink. Any data extracted from the uplink by the downhole module may be sent to the downlink at a subsequent downlink period and received by an intended downhole tool, or broadcast to a group of or all downhole tools.

According to another aspect there is a method of communicating between downhole tools including sending a signal from a first downhole tool to a downhole module and relaying the signal from the first downhole tool to a second downhole tool before the signal reaches a surface telemetry module. The relaying may be done by the downhole module.

According to another aspect of the invention there is a downhole data acquisition system including a surface telemetry system; a downhole telemetry cartridge comprising a downhole toolbus controller; and a plurality of downhole tools; where the downhole toolbus controller may be programmed to extract inter-tool communication (ITC) data from the uplink data stream and may be programmed to copy extracted ITC data to a downlink data stream. The downlink data stream provides the extracted ITC data to one or more of the plurality of downhole tools. In another embodiment, at least one of the plurality of downhole tools includes an extended toolbus interface (XBI) that may be programmed to extract the ITC data from the uplink data stream and may be programmed to copy extracted ITC data to a downlink data stream.

According to one aspect of the invention there is a method of acquiring acoustic data including sending a firing signal in the uplink data stream; extracting the firing signal at a downhole module as the firing signal goes uphole; copying the firing signal and sending it downhole to an acoustic transmitter; firing the acoustic tool according to the firing signal; and receiving acoustic data. The method may further include synchronizing acquisition of sonic data with the firing of the acoustic tool using the firing signal extracted by the downhole module. The sending of a firing signal may be done by an acoustic receiver. The method may include extracting a caliper data signal from the uplink and copying the caliper data signal to a downlink data stream. The caliper data signal may be provided to the acoustic transmitter and receiver. The acoustic transmitter may change the waveform data according to the caliper data signal.

According to one aspect of the method the data intended for downhole tools includes a command to fire sent from a downhole acoustic receiver to a downhole acoustic transmitter. The downhole toolbus controller copies the command to a downlink data stream where the command may be sent to both the downhole acoustic receiver and the downhole acoustic transmitter at a subsequent downlink period. In some applications the downlink data stream may be assigned a higher priority than the surface system commands. Accordingly, the downhole acoustic transmitter may start firing and the receiver, following receipt of a command from the transmitter, may start data acquisition in sync.

According to another aspect the data intended for downhole tools includes borehole diameter information transmitted by a caliper. The downhole module may extract the borehole diameter information from the uplink data stream and copy it to a downlink data stream. The borehole diameter information may be sent to a sonic receiver via the downhole module without sending to the surface.

One of the plurality of downhole tools may include a sonic receiver, and another of the plurality of downhole tools may be a sonic transmitter. A firing signal may be sent from the sonic receiver, extracted from an uplink data stream by the downhole module, and sent to the sonic transmitter and back to the sonic receiver as well. Thus, firing of the sonic transmitter and receiving by the sonic receiver may be synchronized. Further, one of the plurality of downhole tools may include a caliper. Borehole diameter information may be sent from the caliper, extracted from an uplink data stream by the downhole module, and sent to the sonic transmitter and receiver. The caliper is disposed between the sonic receiver and the sonic transmitter according to some embodiments to facilitate maximum distance between the sonic transmitter and receiver. The surface telemetry system may be a telemetry module and the surface system may include a wireline cable.

According to another aspect of the invention, the data intended for downhole tools includes information transmitted uplink by a pump tool, measuring tool, or sampling tool. A downhole module may extract the information to effect fluid measurement from the uplink data stream and copy it to a downlink data stream. The fluid measurement information may be sent to a fluid sampling tool via the downhole module without sending to the surface.

In another aspect of the invention, the data intended for downhole tools includes command information for moving or adjusting by a tractor or positioning apparatus. The downhole module may extract the information to coordinate movement or positioning of downhole tools and copy it to a downlink data stream to be received by a tractor or positioning apparatus. Borehole tools may then be moved or positioned using the data sent via the downhole module without having to return the information to the surface.

There is also provided a method of communicating between wireline downhole tools including examining an uplink data stream with a downhole module; extracting any data intended for downhole tools with the downhole module; and sending any data extracted to one or more downhole tools via the downhole module. The data extracted may be sent with a high priority to one or more downhole tools along a downlink data stream during a subsequent downlink period, which may be the next downlink period.

Additional advantages and novel features of the invention will be set forth in the description which follows or may be learned by those skilled in the art through reading these materials or practicing the invention. The advantages of the invention may be achieved through the means recited in the attached claims.

BRIEF DESCRIPTION OF THE DRAWINGS

The accompanying drawings illustrate preferred embodiments of the present invention and are a part of the specification. Together with the following description, the drawings demonstrate and explain the principles of the present invention.

FIG. 9 is an illustration of one protocol that may be used for writing an ITC message according to the present invention. FIG. 9 illustrates writing a message with an indexed address for its destination to a single receiver.

FIG. 10 is an illustration of a protocol that may be used for writing an ITC synchronization pulse according to the present invention. FIG. 10 illustrates writing a synchronization pulse with an indexed address to a single receiver destination.

Figure 1A:
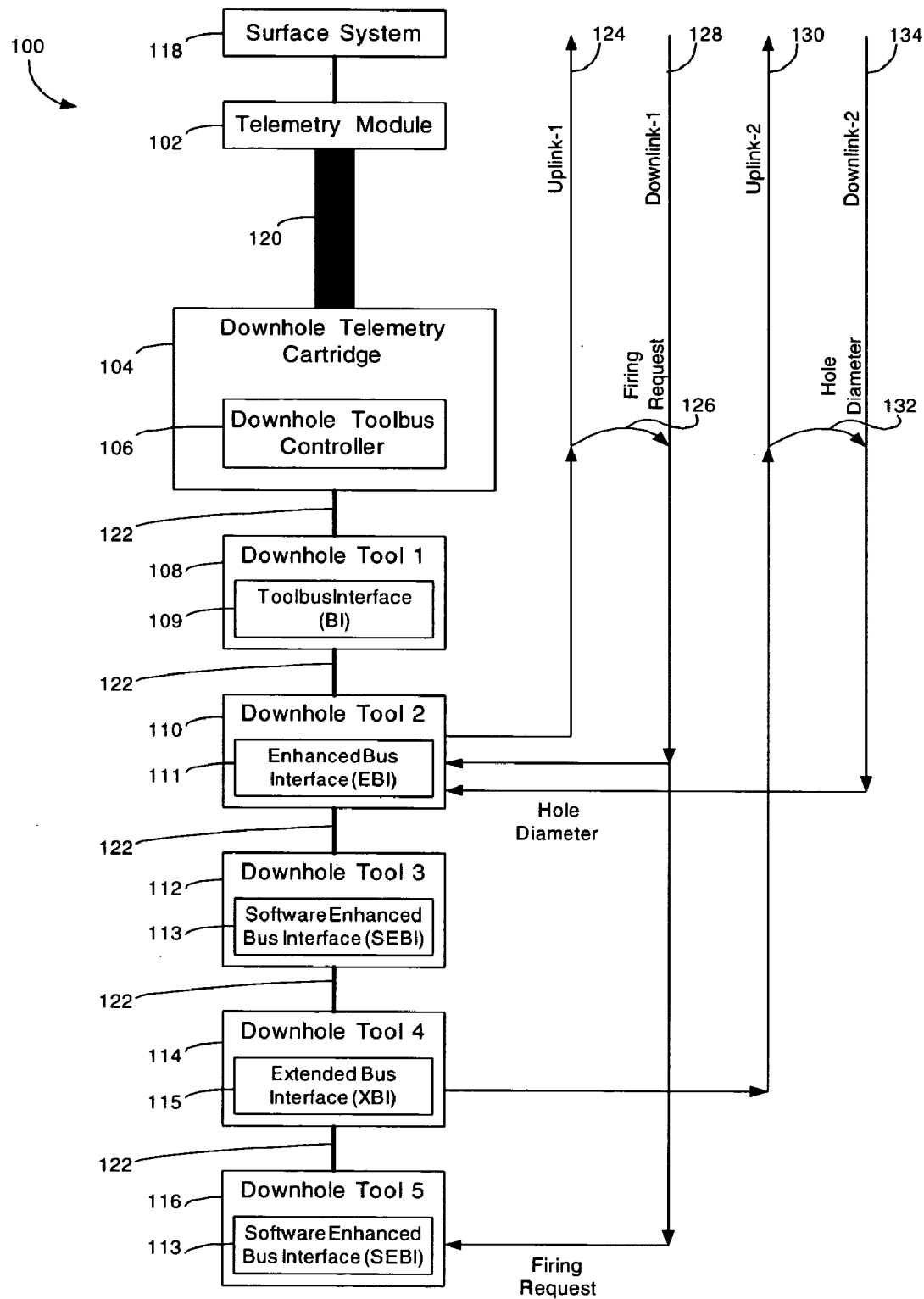
FIG. 1A is a schematic of a wireline tool system according to one embodiment of the present invention.

Throughout the drawings, identical reference numbers and descriptions indicate similar, but not necessarily identical elements. While the invention is susceptible to various modifications and alternative forms, specific embodiments have been shown by way of example in the drawings and will be described in detail herein. However, it should be understood that the invention is not intended to be limited to the particular forms disclosed. Rather, the invention is to cover all modification, equivalents and alternatives falling within the scope of the invention as defined by the appended claims.

DETAILED DESCRIPTION OF THE PREFERRED EMBODIMENTS

Illustrative embodiments and aspects of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, that will vary from one implementation to another. Moreover, it will be appreciated that such a development effort might be complex and time-consuming, but would nevertheless be a routine undertaking for those of ordinary skill in the art having the benefit of this disclosure.

The present invention contemplates methods and apparatus facilitating downhole ITC in a much shorter time than previously possible. Communication between downhole tools is termed "inter-tool" communication herein and includes communication between downhole tools without traveling to and from a surface module as done previously. The principles described herein facilitate more accurate synchronization of various events associated with downhole tools, shorter time lags between commands and responses, and/or a smaller operational overhead. The methods and apparatus of the present invention are preferably implemented by examining data (including command signals) contained in an uplink data stream while the data is still local to the downhole tool. By examining the data before it travels all the way to the surface, any information sent by one or more downhole tools and intended for other downhole tools can be extracted, copied, and transmitted to intended destinations much faster than previous systems allow. The shorter latency period results in better logging information and therefore more efficient well operation. As used herein, the term "extract" or "extracted" means to derive or obtain (information, for example) from a source.

Turning now to the figures, and in particular to FIG. 1A, a schematic overview of a downhole data acquisition system (100) according to principles of the present invention is shown. The downhole data acquisition system (100) includes a surface telemetry system or module (102), a downhole module shown in FIG. 1A as downhole telemetry cartridge (104), and a plurality of downhole tools. In some embodiments, the downhole telemetry cartridge (104) may comprise a downhole toolbus controller (106), and the downhole tool may comprise a toolbus interface (109), an enhanced bus interface (111), a software enhanced bus interface (113), or an extended bus interface (115). According to the embodiment of FIG. 1A, there are five downhole tools (108–116). The surface telemetry system (102) may be part of an overall surface system (118) that comprises a TM. A wireline cable, for example a multiplexed data link cable (120), provides for power and communication between the surface telemetry system (102) and the downhole telemetry cartridge (104). A downhole toolbus (122) provides for communication between the downhole tools (108–116) and the downhole telemetry cartridge (104) in both uplink and downlink directions.

While a typical downhole acquisition system allows for both uplink and downlink communication, any data sent by one downhole tool to another has heretofore traveled an uplink data stream all the way to the telemetry module (102), then all the way back down to the intended tool. According to the present invention, however, a downhole module such as telemetry cartridge (104) comprising a downhole toolbus controller (106) may examine and extract the uplink ITC. If there is any data sent from one downhole tool (108–116) and intended for another downhole tool (108–116), such data is copied and sent to intended downhole tools without waiting for the data to travel all the way to the surface and back down again. Any ITC data is sent by the downhole toolbus controller (106), at a subsequent downlink period, preferably a next downlink period immediately following the uplink period during which the data was extracted.

To realize downhole ITC, which effectively allows communication tools to send data packets in uphole and downhole directions, an enhanced downhole toolbus protocol and downhole module may be used. The downhole module may comprise an enhanced downhole telemetry cartridge (EDTC). The downhole module may comprise a downhole device, such as borehole tool, with an extended bus interface (XBI). An XBI may receive ITC data from both uplink and downlink packets and may send ITC data as an uplink or downlink packet. A software enhanced bus interface (SEBI) may receive ITC data in downlink packets only and may send ITC data in an uplink packet only. A toolbus interface (BI) or an enhanced bus interface (EBI) cannot send ITC data packets but either may receive ITC data in downlink packets. Thus, a downhole tool with a BI or EBI may only receive ITC data in downlink signals; a downhole tool with a SEBI may receive ITC data in downlink signals and may send ITC data in an uplink signal; and a downhole tool with an XBI may receive ITC data in uplink and downlink signals and may send ITC data in an uplink or downlink signal. Downhole tools with either a BI or EBI may act only as receivers for downhole ITC.

Figure 1B:
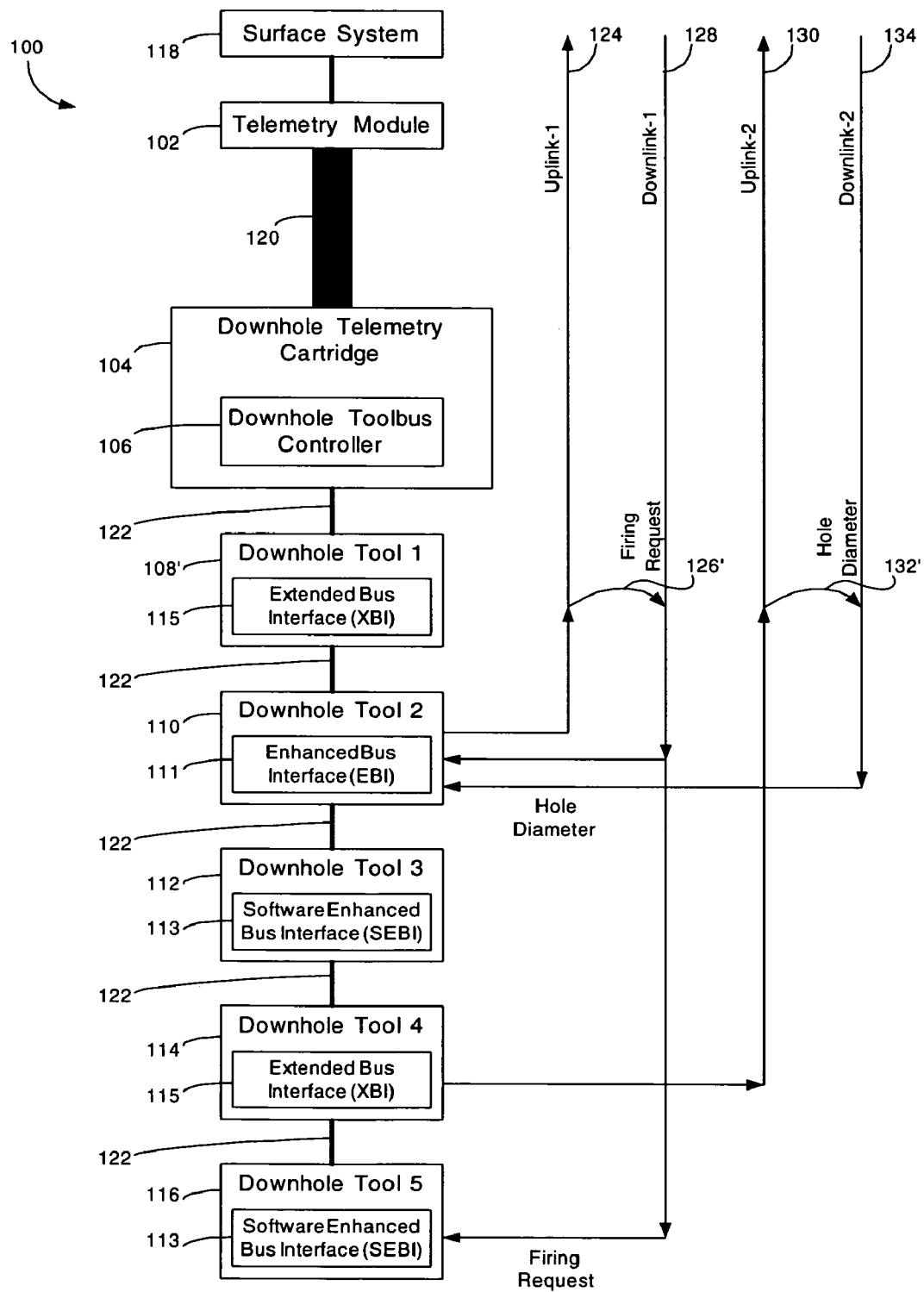
FIG. 1B is a schematic of a wireline tool system according to another embodiment of the present invention.

Refer to FIG. 1B for a schematic overview of another embodiment of the present invention. The downhole data acquisition system (100) includes a surface telemetry system (118) and/or module (102), a downhole module shown in FIG. 1B as a downhole tool with XBI (108'), and a plurality of downhole tools. The data acquisition system may also include a downhole telemetry cartridge (104) including a toolbus controller (106). According to the present invention, the downhole tool with XBI (108') is programmed to extract uplink ITC data. The downhole toolbus controller (106) may also examine uplink data streams. If there is any data sent from one downhole tool (108'–116) and intended for another downhole tool (108'–116), such data is copied and sent to intended downhole tools without waiting for the data to travel all the way to the surface and back down again. ITC data may be sent at a subsequent downlink period via a downhole tool with XBI (108') or downhole toolbus controller (106), preferably a next downlink period immediately following the uplink period during which the data was extracted.

Any ITC may be more quickly facilitated by extracting the communications locally and relaying them back to their intended destinations without first traveling to the surface. For example, according to the embodiments of FIG. 1A and FIG. 1B, Downhole Tool-2 (110) may be a sonic receiver, and Downhole Tool-5 (116) may be a sonic transmitter. There may be any number of downhole tools, (e.g. tools (112 and 114)) between the sonic receiver (110) and sonic transmitter (116) in order to facilitate a long distance between an acoustic transmitter and an acoustic receiver without increasing a total length of a tool string. In a configuration shown in FIG. 1A, one example of ITC is the sending of a firing command by the sonic receiver (110) to the sonic transmitter (116). The command signal to fire is sent by the sonic receiver via Uplink-1 (124). However, instead of having to travel to the surface and back to reach the sonic transmitter (116), a downhole module shown in FIG. 1A as downhole telemetry cartridge (104) comprising a downhole tool bus controller (106) monitors and extracts the firing command (or any other ITC data) and copies it as indicated by an arrow (126) to a subsequent downlink, which, according to FIG. 1A, is Downlink-1 (128). Alternatively a downhole module such as a downhole tool comprising XBI (108') as shown in FIG. 1B monitors and extracts the firing command (or any other ITC data) and copies it as indicated by an arrow (126') to a subsequent downlink, which, according to FIG. 1B, is Downlink-1 (128). Downlink-1 (128) is preferably the next downlink period. During the transmission of Downlink-1 (128), both the sonic receiver (110) and the sonic transmitter (116) receive the firing command. Accordingly, the firing of the sonic transmitter (116) and the acquisition of data by the sonic receiver (110) may be very accurately synchronized by the firing command without waiting for the command to travel the full length of the multiplexed cable (120).

Other data may be communicated between various downhole tools (108–116; 108'–116) without traversing the length of the cable (120) twice as well. For example, Downhole Tool-4 (114) may be a caliper. The caliper (114) generates and transmits borehole diameter information. In a typical arrangement, the caliper (114) would transmit borehole diameter information to the downhole telemetry cartridge (104), and the information would continue uphole to the surface, then back downhole. However, according to the present invention a downhole module [such as downhole telemetry cartridge (104) comprising a downhole toolbus controller (106)] extracts the borehole diameter information sent via another uplink, shown in FIG. 1A as Uplink-2 (130) and copies it as indicated by an arrow (132) to a subsequent downlink, which according to FIG. 1A is Downlink-2 (134). Alternatively the downhole module may be a downhole tool comprising XBI (108') that extracts the borehole diameter information sent via another uplink, shown in FIG. 1B as Uplink-2 (130) and copies it as indicated by an arrow (132') to a subsequent downlink, which according to FIG. 1B is Downlink-2 (134). The borehole diameter information is then sent and taken into account by the sonic receiver (110) or sonic transmitter (116). It will be understood, however, that while the fire command and the borehole diameter information are shown in FIG. 1A and FIG. 1B as being transmitted along separate uplinks and downlinks, this is not necessarily so. Multiple data packets may be sent via a single uplink and/or downlink cycle.

Further, it will be understood that the two data types described above are exemplary in nature, and not limiting. Data of any kind may be sent, extracted, and copied to subsequent downlinks—all being done downhole—according to the principles described herein. Any ITC between downhole tools such as the tools (108–116; 108'–116) shown may be quickly facilitated by extracting and relaying ITC data downhole according the principles discussed. Some further details and examples of downhole ITC are discussed below with reference to FIGS. 2–10.

Figure 2A:
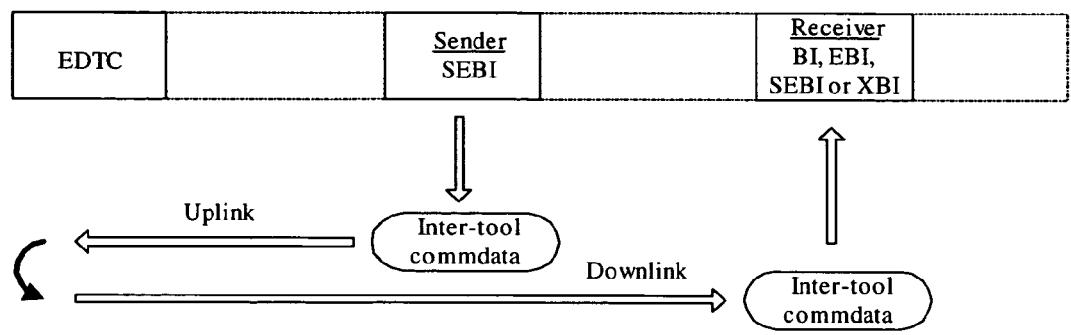
FIGS. 2A–2E are schematics of a downhole communication system illustrating ITC according to various aspects of the present invention.
Figure 2B:
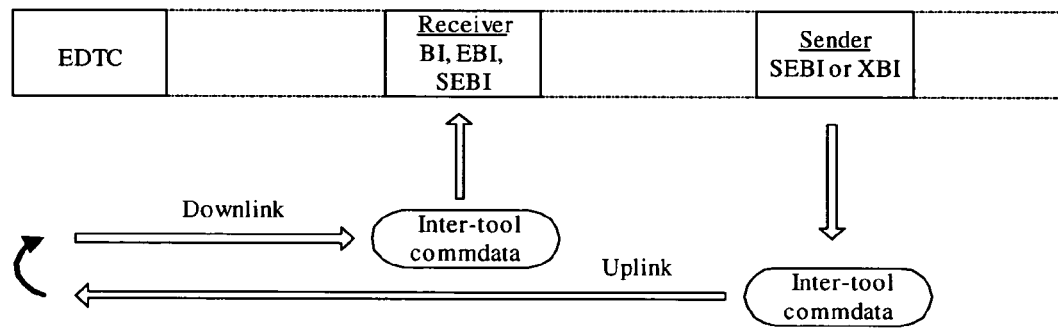
Figure 2C:
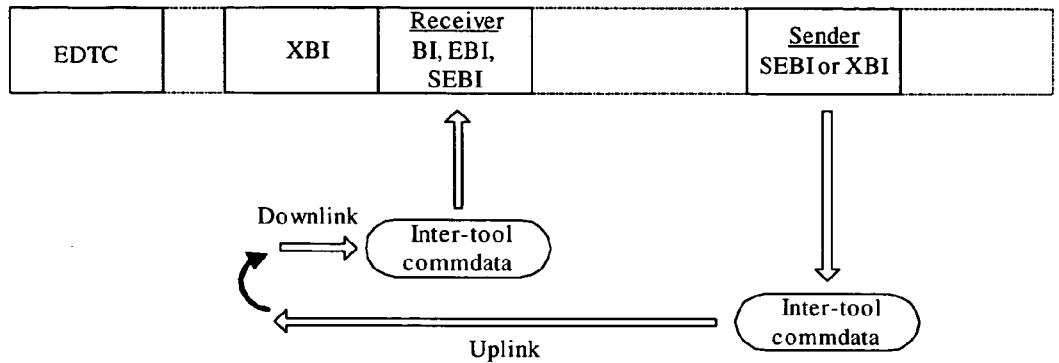
Figure 2D:
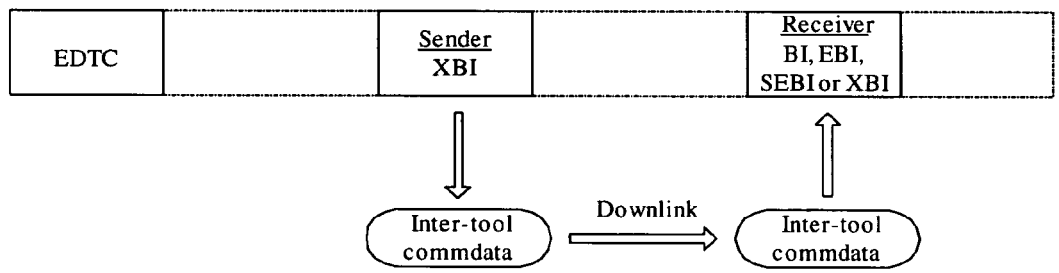
Figure 2E:
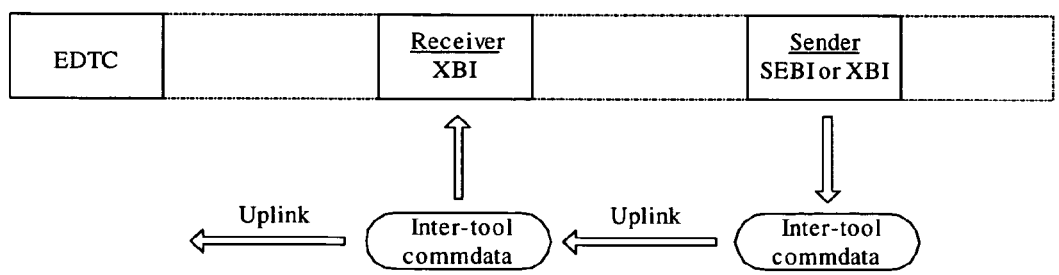

Referring to FIG. 2A, a sender transmits ITC data in an uplink packet and the EDTC receives it and sends it back in a downlink packet to a receiver. The toolbus protocol compatibility remains as long as the ITC data has the same uplink packet format, and if the downlink ITC data has the same format as normal downlink packets. Accordingly, a tool string configuration may be arbitrary such that sender and receiver tools can be located either uphole or downhole of one another and still communicate there between. Referring to FIG. 2B, the sender is located downhole of the receiver. The sender transmits an ITC as an uplink packet and the EDTC receives it and sends it back as a downlink packet to be received to a receiver. Another aspect of the present invention is shown in FIG. 2C. The sender transmits an uplink packet and the downhole module comprising XBI receives the packet and sends it back as a downlink packet to a receiver. FIG. 2D shows another aspect of the present invention. A downhole module comprising XBI as a sender transmits ITC data directly in a downlink packet to be received by a receiver, which is located downhole of the sender. FIG. 2E shows another aspect of the present invention. The sender transmits an uplink packet to a receiver that extracts data intended for that receiver and then passes the remainder of the uplink packet.

Figure 3:
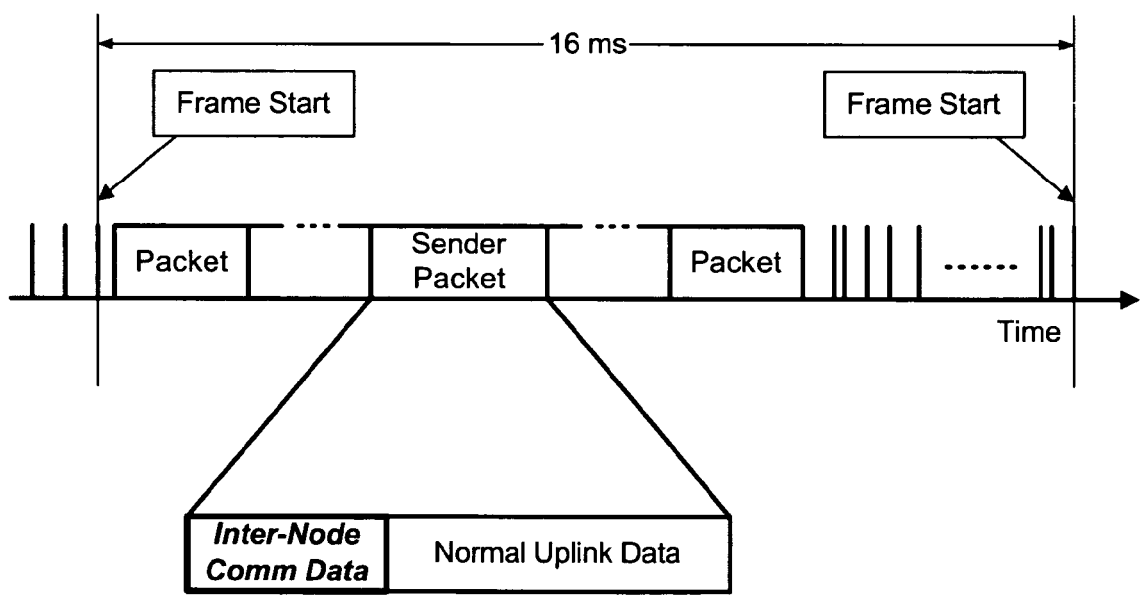
FIG. 3 is an illustration of one uplink method used to facilitate downhole ITC according to the present invention.

At least two methods may be used for the uplink to facilitate principles of the present invention. One method is to merge ITC data with normal uplink packets as shown in FIG. 3. A concatenated uplink packet as shown in FIG. 3 can use bandwidth efficiently if the ITC is relatively rare (i.e. a lower occurrence rate than the TB frame rate). This method can be called asynchronous transmission.

Figure 4:
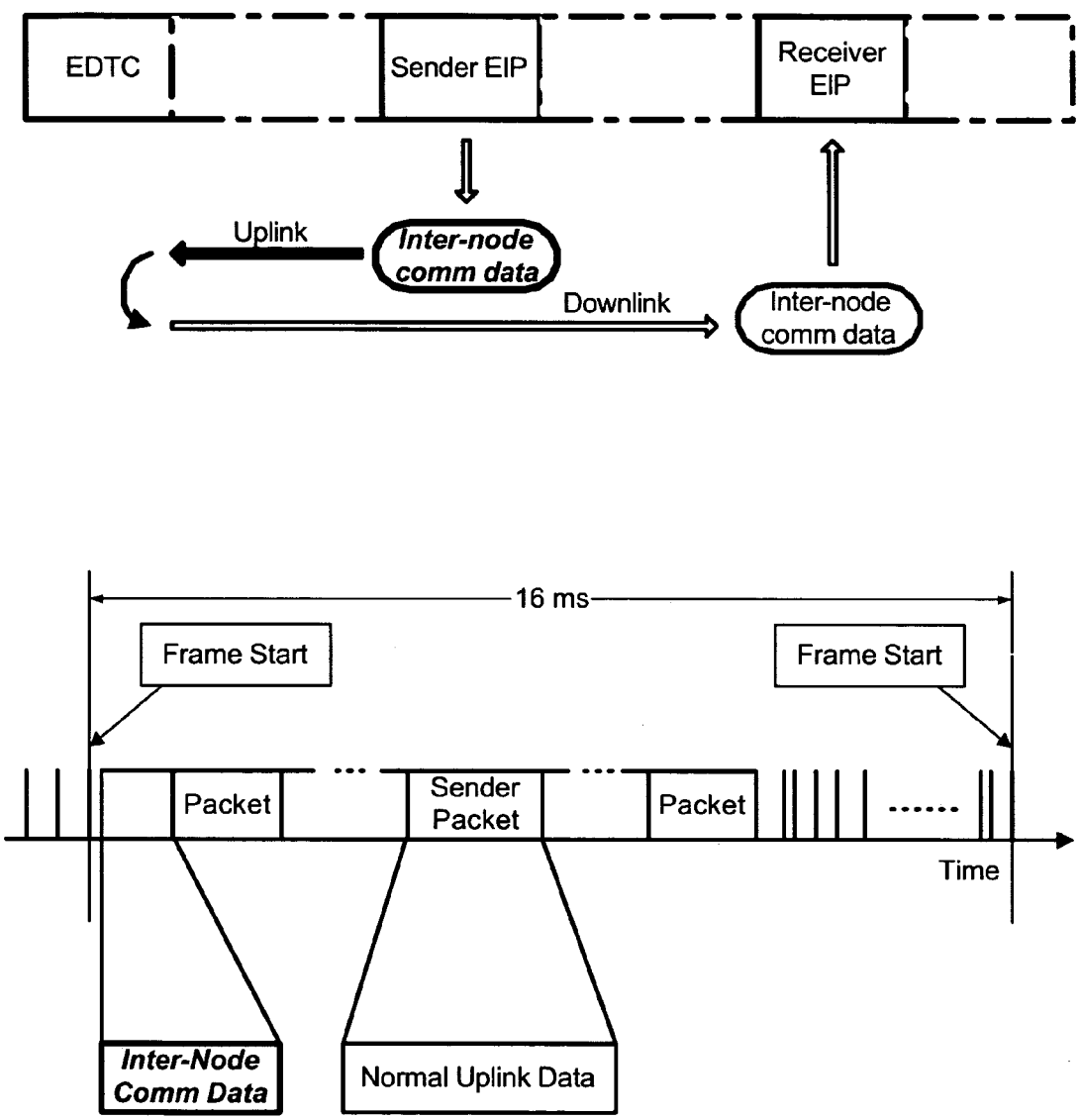
FIG. 4 is an illustration of another uplink method used to facilitate downhole ITC according to the present invention.

Another method that may be used is to set a separate time slot for uplink packet transmission in typical Time Division Multiplexing (TDM) fashion, prior to the normal uplink packet window as shown in FIG. 4. The separate TDM ITC packet of FIG. 4 is a preferred transmission method if ITC is a common occurrence (e.g. ITC occurring at a rate near or equal to the TB frame rate). The ITC data can be easily identified and handled by the EDTC, and such a method is called an isochronous transmission. The terms "asynchronous" and "isochronous" coincide with the IEEE 1394 definitions.

Downlink ITC data preferably maintains the same format as a usual downlink packet to enable standard BI to repeat. The maximum packet length of the downlink packet is 15 words for EBI and 8 words for BI, but other lengths may also be used or developed. Since the uplink packet length may be more than 15 words, in such an instance the data is segmented to meet this word-length restriction. The segmentation, if any, may be carried out by the EDTC or a downhole module comprising XBI, or the uplink packet may have a segmented structure in advance.

According to some methods a rule may be prescribed such that the ITC downlink packets have a priority for transmission over normal downlink packets, thus assuring a maximum latency for ITC. For example, as shown in FIGS. 3 and 4, the maximum latency from transmission to reception is 16 ms, which is the frame rate of the EFTB.

Each of the two methods described above for uplink transmission has its advantages. Other methods may also be used in addition to the two exemplary methods described above as well. When considering the uplink methods (isochronous and asynchronous or others) for an implementation for downhole ITC, each or all may be considered distinct. If methods have complimentary advantages, more than one method may be supported. However, in some circumstances only one method may be chosen.

For example, considering protocol overhead in the uplink packet, the packet needs 6 words for its header and trailer. In addition, the gap between two uplink packets needs 8 words. Hence, the protocol overhead per uplink packet becomes 14 words. If the total tool count is, for example, 63 tools, the total overhead is 882 words. Therefore, the isochronous uplink method needs a 882-word overhead, when the total tool count is 63. This overhead reduces the effective bandwidth for actual data or payload significantly. Therefore, isochronous uplink communication may not be adopted, and the asynchronous method is considered hereafter.

The downhole module may have a specific FIFO (first in, first out) buffer for storing the ITC downlink packets. The buffer may resemble a typical downlink packet buffer that interfaces from the cable to the toolbus. If the ITC buffer stores some ITC packets, they may be sent during the subsequent downlink period (preferably the next downlink period) prior to normal downlink packets from the surface.

Therefore, ITC downlink packets may have a higher priority than normal downlink packets.

Figure 5:
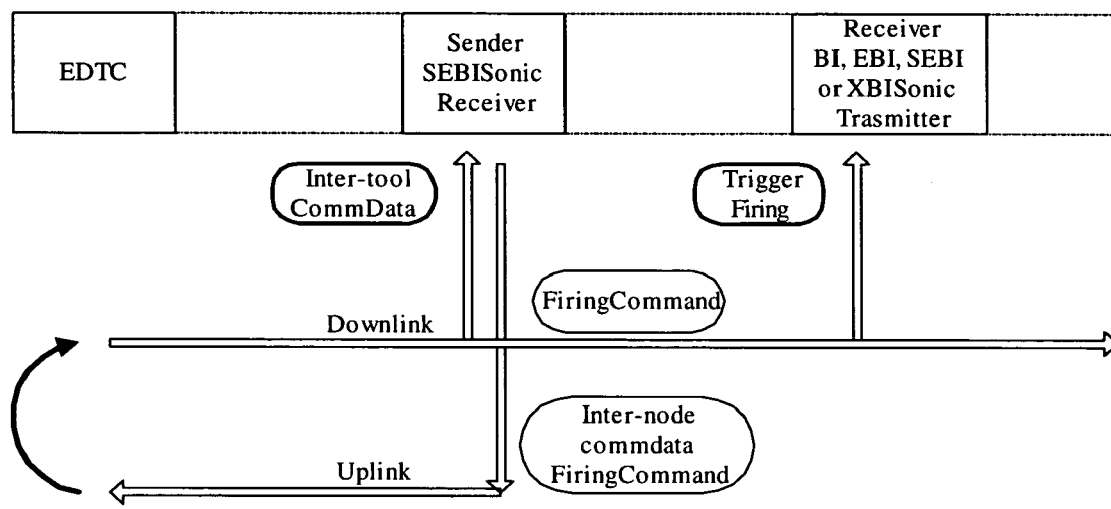
FIG. 5 is an illustration of one way of synchronizing sonic firing with data acquisition according to the present invention.

As discussed above with reference to FIG. 1, the ITC enables, for example, a sonic transmitter to be spaced far from its sonic receiver (such that other tools are situated there between) and still communicate with each other. Thus a long spacing between the sonic transmitter and receiver can be accomplished while utilizing the length of a tool string efficiently. Further, by implementing methods of the present invention, sonic waveform acquisition can be accurately synchronized with sonic source firing. One scheme for synchronizing sonic firing and waveform acquisition (similar to that shown in FIG. 1A) is shown in FIG. 5. The sender tool (sonic receiver) sends a firing trigger command via ITC. The command can be received by both the sender (sonic receiver) and by the receiver (sonic transmitter). Upon arrival of the command, the receiver (sonic transmitter) fires the sonic source, and the sender (sonic receiver) starts waveform acquisition.

Figure 6:
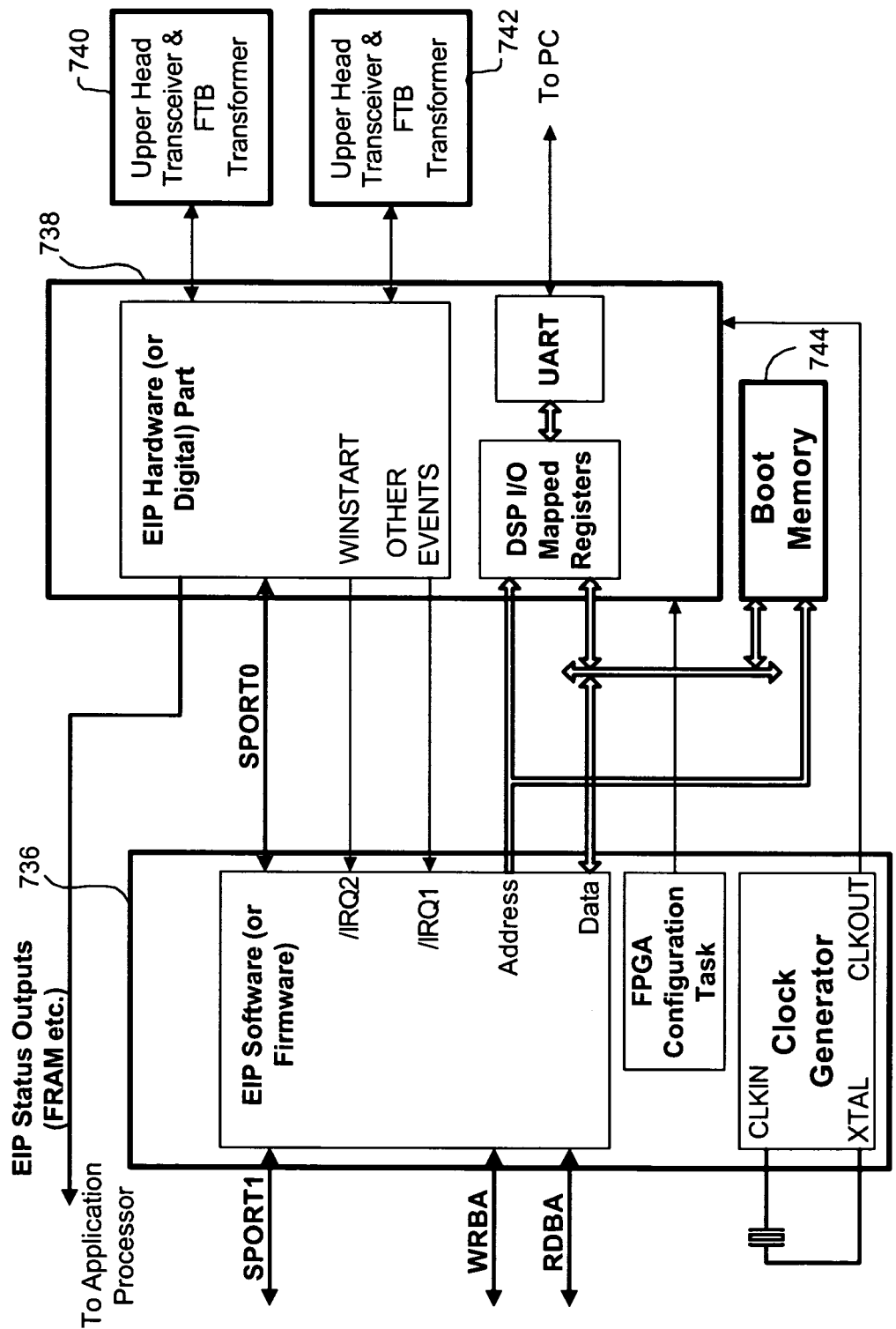
FIG. 6 is a software block diagram that may be used according to some aspects of the present invention to facilitate downhole ITC.

A SEBI or an XBI may support the sender functionality for ITC. FIG. 6 illustrates a SEBI or XBI block diagram according to one aspect of the present invention. The two main components according to the example of FIG. 6 are a microprocessor (MPU) (736) and a field programmable gate array (FPGA) (738). A boot memory (744) may also be added to facilitate start up of both the MPU and FPGA after power-up. Using a MPU may be more useful to carry out the arithmetic operation than implementing a digital circuit in a FPGA. Some functions may not require fast processing and may be executed in parallel by digital circuitry, but such functions may also be conducted by a MPU. Thus one aspect of the SEBI or the XBI may include splitting the interface function into two parts. One part may be implemented by the FPGA because it is time-critical, while the other may be implemented by the MPU. By splitting the interface function into two parts, a smaller and less expensive FPGA may be used, and a MPU is much less expensive than a large FPGA. Alternatively, however, the interface function may not be split, and a more expensive FPGA used. A UART (Universal Asynchronous Receiver-Transmitter) function is supported by the FPGA for diagnostic purposes according to the embodiment shown. Accordingly, an operator may inquire into the internal status of the MPU and retrieve FPGA information by connecting a PC to a port with a dedicated PC software tool.

Figure 7:
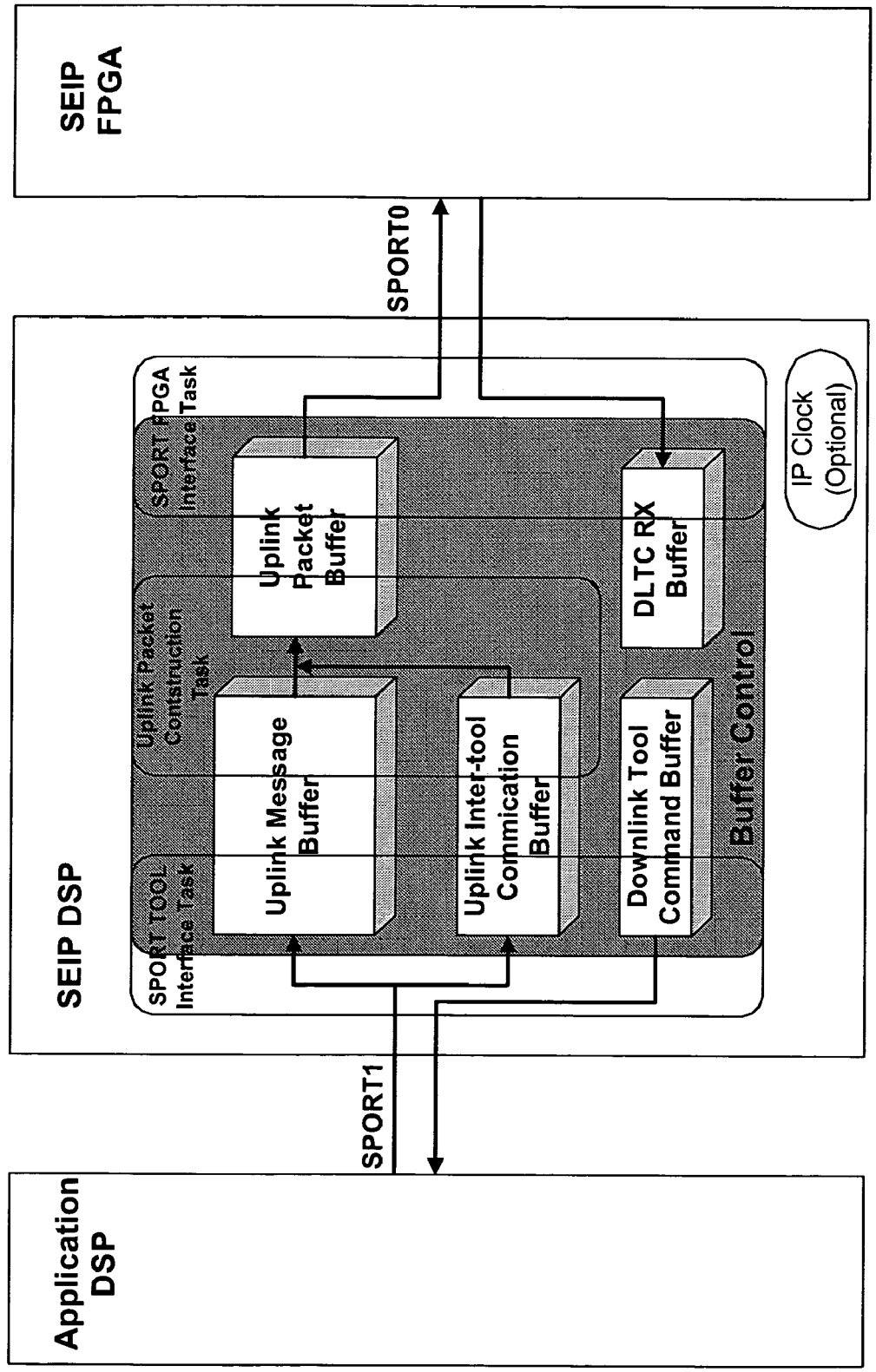
FIG. 7 is a software data flow and task diagram according to one embodiment of the present invention.

FIG. 7 illustrates two parts when the interface function is divided. The first is a software (or firmware) part and the second is a hardware (or digital) part, to which MPU and FPGA are assigned, respectively. These two parts work together as they communicate with each other, mainly via SPORT0. Two interrupt inputs are also utilized according the present embodiment so that the hardware part is able to notify certain events to the software part while some registers in the FPGA are mapped to the I/O memory space of the MPU. The MPU can retrieve additional information from the FPGA through a data bus. According to some aspects, the MPU boots first following a reset, then it programs the FPGA with configuration data stored in the boot memory (744, FIG. 6).

Figure 8:
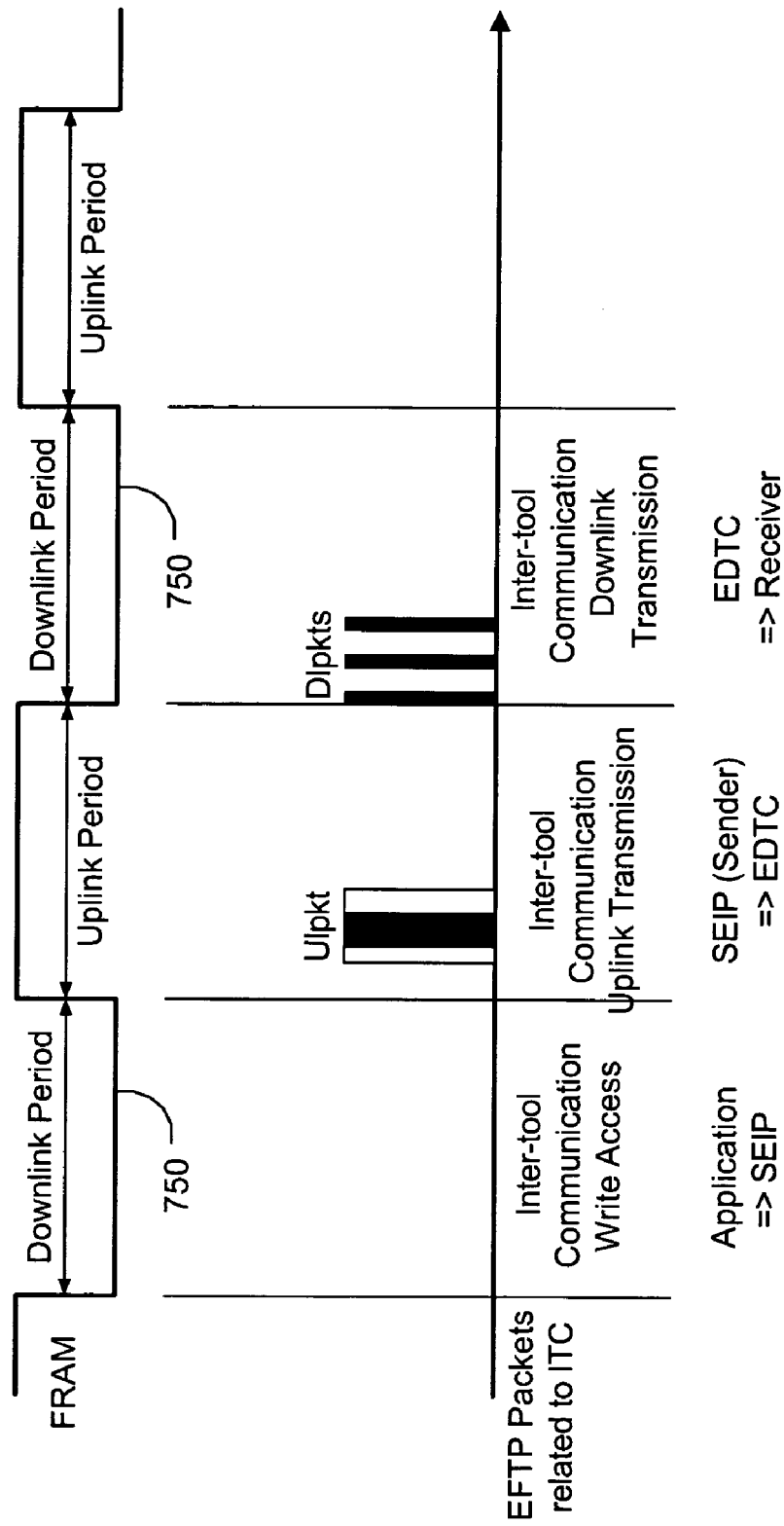
FIG. 8 is a writing rule and data flow diagram for facilitating downhole ITC according to one embodiment of the present invention.

As mentioned above, ITC according to the present invention may ensure a maximum latency from a data write by a sender to a data arrival at a receiver. Therefore, ITC access may incur a rule. The rule may be that access must be made during a downlink period as shown in FIG. 8. The software EBI or XBI provides an output signal name FRAM. A low state (750) of FRAM indicates the downlink period.

One method that may be used to follow this rule is to connect the EFTB frame to an interrupt input of the application processor. This can signify the start of a downlink period to the application processor when a falling edge of the FRAM output is detected to trigger the interrupt. The duration of the downlink period depends on the tool string configuration, but the minimum period is generally longer than 1 ms. The minimum period is guaranteed by the downhole toolbus controller of the EDTC. Even during this minimum period, the ITC access can be completed.

There may be many kinds of ITC access. The following describes three kinds of accesses, but there may be others of any kind. The three access types described below are: writing an ITC message, writing an ITC sync pulse command, and writing an ITC reset pulse. Each access may have a different destination type. According to one embodiment described below, each access type has three kinds of destination types. The three destination types according to the description below are "Index," "Group," and "Broadcast" types, corresponding to the downlink packets. The interface (I/F) command/response words are different for each destination type, which the application processor can select depending on an intended purpose.

FIG. 9 illustrates a procedure for the first access type, writing an ITC message with an index addressing its destination. This procedure may be used when the application desires to send some data to single receiver. The application processor sends the I/F command with a message length and tool index included. When the SEBI or XBI receives a request (ITCMSGINDEXWRREQ in FIG. 9), it checks not only if the present time is a downlink period, but also if the requested message can be sent on the following uplink packet in terms of the assigned window. If both conditions are met, the SEBI or XBI sends back acknowledgment to the application processor (ITCMSGINDEXWRACK in FIG. 9). The application then sends an ITC message to the bus interface without a long delay. After the SEBI or XBI receives all the data, it sends back a ITCMSGWRDONE word to the application. If at least one of the two conditions mentioned above is not met, the SEBI or XBI sends NAK (not acknowledged) back to the application. In such a case, the application relinquishes its request.

When the application desires to send the same data simultaneously to a plurality of receivers, the group addressing type of ITC may be used. Each tool has one of group addresses. In the present case it is assumed that all the receivers have the same group address and that non-receivers have different group addresses. When the application desires to send some data to all tools in a tool string, it may use the broadcast or "all" addressing type of ITC. If only broadcast messages are to be used, the application processor does not need to keep address information for each of the receivers or groups of receivers.

FIG. 10 illustrates a procedure for the second access type, writing an ITC sync pulse. The ITC sync pulse command may be used to generate a single pulse at a receiver end. Writing the ITC SYNC pulse at a sender tool turns into the SYNC pulse downlink packet at the EDTC, SEBI, or XBI. When it is received at a receiver tool, it generates a pulse on an output line identified as SYNP. The application can use the signal to observe the SYNC output by any convenient means. The ITC SYNC pulse command, like the previous message communication, has three kinds of destination types which differ only in destination type (Index, Group, Broadcast). If an operator intends to synchronize several tools in a tool string, one of the methods provides the ITC SYNC pulse of group addressing or broadcasting type whereas the index type method is provided. The timing of receipt of the SYNC pulse at different tools is almost simultaneous, thus a highly accurate synchronization may be accomplished. There is no length field of the SEBI I/F command, and no data transfer occurs subsequently. The ACK case is replaced by the DONE case.

The third access type, writing the ITC tool reset pulse, is similar in method to the ITC SYNC pulse. The resulting pulse is shown as a TLRP (tool reset pulse) output of a receiver tool. It will be understood, however, that the BI initializes its internal data buffers upon receiving the TLRP packet. Three kinds of destination types associated with the TLRP pulse include the Index, Group, and Broadcast types.

There are several pieces of bus interface information that may be useful to the application. For reading tool index and Group addresses, the XBI or SEBI informs the application processor of its present value of tool address and Group address. The application processor can read XBI or SEBI statuses at any time. Each access or query is responded to by the bus interface. NAK never occurs.

The preceding description has been presented only to illustrate and describe the invention and some examples of its implementation. It is not intended to be exhaustive or to limit the invention to any precise form disclosed. Many modifications and variations are possible in light of the above teaching. The preferred aspects were chosen and described in order to best explain the principles of the invention and its practical application. The preceding description is intended to enable others skilled in the art to best utilize the invention in various embodiments and aspects and with various modifications as are suited to the particular use contemplated. It is intended that the scope of the invention be defined by the following claims.

What is claimed is:

1. A method of communication between wireline downhole tools comprising:
   examining an uplink data stream;
   extracting from the uplink data stream any data intended for downhole tools; and
   transmitting the extracted data to an intended downhole tool.

2. The method of claim 1, where a downhole module performs the step of examining and extracting the uplink data stream.

3. The method of claim 1, the transmitting further comprising transmitting via a downlink data stream to the intended downhole tool the extracted data.

4. The method of claim 1, wherein the data intended for downhole tools does not require transmission to the surface before it is sent downhole.

5. The method of claim 1, further comprising transmitting any data intended for downhole tools to a group of downhole tools.

6. The method of claim 1, further comprising broadcasting any data intended for downhole tools to all downhole tools.

7. The method of claim 1, wherein the data intended for downhole tools comprises a command to fire sent from a downhole acoustic receiver and intended for a downhole acoustic transmitter.

8. The method of claim 7, wherein the downhole acoustic transmitter starts firing, and the receiver starts data acquisition in sync with the firing of the transmitter following receipt of the command by the transmitter and receiver.

9. The method of claim 1, wherein the data intended for downhole tools comprises borehole diameter information transmitted by a caliper.

10. The method of claim 9, wherein a downhole module extracts the borehole diameter information from the uplink data stream and copies it to a downlink data stream.

11. The method of claim 10, wherein the borehole diameter information is sent to a sonic transmitter via the downhole module without returning to the surface.

12. The method of claim 2, wherein the downhole module is a downhole telemetry cartridge comprising a downhole toolbus controller; a downhole device comprising a software enhanced toolbus interface (SEBI); or a downhole device comprising an extended toolbus interface (XBI).

13. The method of claim 12, wherein the downhole device is a borehole tool.

14. A downhole data acquisition system comprising:
   a surface telemetry system;
   a downhole telemetry cartridge comprising a downhole toolbus controller; and
   a plurality of downhole tools;
   wherein the downhole toolbus controller is programmed to extract uplink ITC data and transmit the extracted uplink ITC date to one or more of the plurality of downhole tools.

15. The system of claim 14, wherein the downhole toolbus controller is programmed to copy the extracted ITC data to a downlink data stream.

16. The system of claim 15, wherein the downlink data stream provides the extracted ITC data to the one or more of the plurality of downhole tools.

17. The system of claim 14, wherein one of the plurality of downhole tools comprises a sonic receiver, and another of the plurality of downhole tools comprises a sonic transmitter.

18. The system of claim 17, wherein a firing signal is sent from the sonic receiver, extracted from an uplink data stream by the downhole toolbus controller, and sent to the sonic transmitter.

19. The system of claim 18, wherein the firing signal is also sent to the sonic receiver and the firing of the sonic transmitter and the receiving of the sonic receiver is synchronized by the extracted firing signal.

20. The system of claim 14, wherein one of the plurality of downhole tools comprises a caliper.

21. The system of claim 20, wherein borehole diameter information is sent from the caliper, extracted from an uplink data stream by the downhole toolbus controller, and sent to a sonic transmitter.

22. A method of acquiring acoustic data comprising:
   sending a firing signal uphole;
   extracting the firing signal with a downhole module as the firing signal goes uphole;
   copying the extracted firing signal and sending it downhole to an acoustic transmitter; and
   firing the acoustic tool according to the extracted firing signal.

23. The method of claim 22, further comprising synchronizing acquisition of sonic data with the firing of the acoustic tool using the extracted firing signal.

24. The method of claim 22, wherein the sending of the firing signal is done by an acoustic receiver.

25. The method of claim 22, further comprising extracting a caliper data signal with the downhole module and copying the caliper data signal with high priority to a downlink data steam.

26. The method of claim 25, wherein the caliper data signal is provided to an acoustic transmitter.

27. A method of communicating between wireline downhole tools comprising:

examining an uplink data stream with a downhole module;

extracting from the uplink date stream any data intended for downhole tools with the downhole module; and sending the extracted data to one or more downhole tools.

28. The method of claim 27, wherein the data extracted is sent to the one or more downhole tools along a downlink data stream during a subsequent downlink period.

29. The method of claim 27, wherein the uplink data stream comprises a command to fire sent from a downhole acoustic receiver and intended for a downhole acoustic transmitter.

30. The method of claim 29, further comprising synchronizing downhole acoustic transmitter firing and downhole receiver data acquisition based on the command.

31. The method of claim 27, wherein the data intended for downhole tools comprises borehole diameter information transmitted by a caliper.

32. The method of claim 27, wherein the data intended for downhole tools comprises information transmitted to effect taking a fluid sample.

33. The method of claim 27, wherein the data intended for downhole tools comprises borehole diameter information transmitted to effect movement of a tool or tool string.

34. The method of claim 33, wherein the downhole module extracts the borehole diameter information from the uplink data stream and copies it to a downlink data stream.

35. A method of communicating between downhole tools comprising:

sending a signal from a first downhole tool to a downhole module;

relaying the signal from the first downhole tool to a second downhole tool before the signal reaches a surface telemetry module, wherein the relaying comprises extracting the signal and transmitting the extracted signal by the downhole module.

36. A method of communicating between downhole tools comprising:

sending a signal from a first downhole tool;

intercepting the signal at a downhole module before the signal reaches a surface telemetry module; and transmitting the intercepted signal to at least one downhole tool.

37. The method of claim 36, wherein the signal is relayed by the downhole module to the at least one downhole tool.

38. The method of claim 37, wherein the downhole module is a downhole telemetry cartridge comprising a downhole toolbus controller; a downhole device comprising a software enhanced toolbus interface (SEBI); or a downhole device comprising an extended toolbus interface (XBI).

39. A borehole telemetry system comprising a surface telemetry module, a downhole module, and a multiplexed data link between the surface module and the downhole module capable of transferring data alternately between an uplink in which data is transferred from the downhole module to the surface module and a downlink in which data is transferred from the surface module to the downhole module; wherein the uplink data can be examined and selectively extracted by the downhole module and can be transmitted to the downlink.

40. The system of claim 39, wherein the downhole module can extract any uplink data intended for downhole tools.

41. The system of claim 39, wherein the downhole module can store and copy any uplink data extracted from the uplink to the downlink.

42. The system of claim 41, wherein any data extracted from the uplink by the downhole module is copied to the downlink at a subsequent downlink period and received by an intended downhole tool.

43. The system of claim 42, wherein any data extracted from the uplink by the downhole module is copied to the downlink at the subsequent downlink period and broadcast to a group of or all downhole tools.

44. The system of claim 39, wherein the data link is a wireline cable.

45. The system of claim 44, wherein the wireline cable extends between a plurality of downhole tools.

46. The system of claim 45 wherein the plurality of downhole tools comprise two or more of an acoustic receiver, an acoustic transmitter, a caliper, and a sampler.

47. The system of claim 39 wherein the downhole module is a downhole telemetry cartridge comprising a downhole toolbus controller; a downhole device comprising a software enhanced toolbus interface (SEBI); or a downhole device comprising an extended toolbus interface (XBI).

48. The system of claim 3, wherein the downlink date stream sends data from a telemetry module.

* * * * *